United States Patent [19]

Tew

[11] Patent Number: 4,857,824
[45] Date of Patent: Aug. 15, 1989

[54] MOVABLE CORE POSITION TRANSDUCER

[75] Inventor: Sydney K. Tew, New Baltimore, Mich.

[73] Assignee: Cadillac Gage Textron Inc., Warren, Mich.

[21] Appl. No.: 237,439

[22] Filed: Aug. 29, 1988

Related U.S. Application Data

[63] Continuation of Ser. No. 74,355, Jul. 16, 1987, abandoned.

[51] Int. Cl.$^4$ .................................................. G05F 3/04
[52] U.S. Cl. .................................... 323/347; 324/208; 336/45; 336/136
[58] Field of Search .................. 323/328, 347; 336/45, 336/136, 224; 340/870.31; 324/208

[56] References Cited

U.S. PATENT DOCUMENTS

| | | |
|---|---|---|
| 3,054,976 | 9/1962 | Lipshutz . |
| 3,546,648 | 12/1970 | Chass .................................. 336/136 |
| 4,103,233 | 7/1978 | Timmermans et al. ......... 340/870.31 |
| 4,282,485 | 8/1981 | Pauwels et al. ...................... 323/347 |
| 4,437,019 | 3/1984 | Chass .................................. 336/136 |

FOREIGN PATENT DOCUMENTS

| | | | |
|---|---|---|---|
| 614936 | 12/1948 | United Kingdom | ................ 336/136 |
| 2115929 | 9/1983 | United Kingdom . | |

*Primary Examiner*—William H. Beha, Jr.
*Attorney, Agent, or Firm*—John C. Evans

[57] ABSTRACT

A two-wire linear transducer comprised of a high permeability finite length core that is positioned with respect to a continuously wound variable pitch coil. The cores is displaced from the initial stroke position at one end of the coil to the opposite end thereof to produce an output signal which varies with displacement. The coil is energized by a constant alternating current source and has a winding configuration that produces an alternating output voltage. The imaginary component of the alternating output voltage varies linearly and continously in amplitude in proportion to the movement of the ferrite core from its initial stroke position to its end stroke position.

4 Claims, 1 Drawing Sheet

MOVABLE CORE POSITION TRANSDUCER

This is a continuation of application Ser. No. 074,355, filed on July 16, 1987, now abandoned.

BACKGROUND OF THE INVENTION

This invention relates to a transducer for producing an electrical output signal and more particularly to a position transducer to convert mechanical displacement to a proportional electrical signal for all stroke positions of the device.

RELATED PRIOR ART

Position transducers to produce electrical signals which vary linearly with respect to the position of a movable core are set forth in U.S. Pat. Nos. 3,054,976 issued Sept. 18, 1962, to Lipshutz and 4,437,019 issued Mar. 13, 1984, to Chase. Such position transducers employ transformer techniques and require more than two lead wire to provide power to the primary wiring coils and carry the output signal from the secondary winding coils. Similarly, such multiple lead wires are required in Great Britain Patent specification No. 963,715 dated Nov. 27, 1962. Such prior art configurations are arranged so that axial movement of a core with respect to the coil will cause a voltage to be induced which purportedly is related to the position of the core with respect to the wire coils. Null positions center the core within the bobbin and this may result in longer devices and will have lower signal to noise ratios in the null region. Furthermore, such devices require four or more wire leads in order to provide an operating mode.

Such four wire configurations require a larger number of connector contacts which will require more space and add to the weight of the assembly in an operating system. Furthermore, the length of the device must be increased to maintain a desired relationship between the finite length core and the coils in order to produce output signals which relate to the mechanical movement which is being detected by the transducer. Specifically, the predetermined relationship of coils and cores requires that the core be placed in an initial stroke position corresponding to a null position and movement from either side of the null position produces the output signal. In such cases, the total length of the device must be extended to provide for a stroke length which matches the stroke of the mechanical device which is being sensed by the transducer. Consequently, the transducer length is greater than the actual stroke of the device and the resultant envelope and weight of the transducer are commensurately increased. Such devices, while suitable for certain applications, are unacceptable in systems which require reduced weight and envelope sizes as, for example, in the aerospace industry.

Other prior position transducers are known which include a continuously wound variable pitch helical winding and two wires. An example of such an arrangement is set forth in United Kingdom Patent Application No. 2,115,929 which is used for measuring changes in distance between two bodies or members to alter the inclination of vehicle head lamps in accordance with the load of the vehicle. In the -929 application, the winding ratios of the coil are selected to produce a non-linear signal from the coil. The coil is associated with a solid ferrite rod which is driven with respect to the coil to produce a non-linear output signal that is then processed by measuring means to produce an output signal which varies substantially directly proportionally with relative penetration of the rod core with respect to the non-linearly wound coil. The -929 transducer requires an electronic circuit in association therewith to achieve a linear output signal. In such an arrangement, the output signal from the coil is such that a real voltage component of the output voltage from the coil is included in the output signal. The real voltage is dependent upon the resistance of the coil and, consequently, the device is temperature sensitive since ambient temperature variations will change the coil's resistance and, hence, change the real voltage component at the output of the transducer. This can affect the sensitivity of the transducer in certain applications. Furthermore, the provision of a solid rod core and a core that is formed of ferrite material with low permeability and, consequently, can have high residual magnetism and an undesirable hysteresis which also can affect the sensitivity of the transducer. Finally, the -929 position transducer has an initial core position that extends the over all length of the transducer and, thus, increases the weight of the device and also increases the space of the envelope for containing the transducer.

An object of the present invention is to provide a two-wire position transducer that is configured to have a reduced weight and a reduced space envelope, and furthermore, to provide an output signal directly from the coil that is not temperature sensitive and to do so by provision of a continuously helically wound coil that is wound in a manner to produce a linear imaginary component in the voltage output from the coil as a finite length core is moved relative to the coil. Thereby a device that does not require unique electronics to linearize a signal may be utilized.

Yet another object of the present invention is to provide an improved system for measuring changes in the movement of a mechanical device by the provision of circuit means including means for producing a constant current input to a two-wire coil; and winding the two-wire coil so as to produce an imaginary component in the voltage across the coil which remains linear as a high permeability core of finite length is moved with respect to the coil from an initial position at one end of the coil to a final position at the opposite end of the coil.

Yet another object of the present invention is to provide a position transducer in accordance with either of the preceding objects wherein the linear imaginary output voltage signal from the coil is processed by a ninety degree shifted synchronous demodulator to produce a linear d.c. voltage signal that is insensitive to variations in temperature changes of the two-wire coil.

Other objects will become apparent from the following description with reference to the accompanying drawings.

SUMMARY OF THE INVENTION

The above and other beneficial objects of the present invention are obtained by winding a coil on a hollow bobbin so that the coil will have a continuously variable pitch throughout its length. A finite length core is located to be wholly within the bobbin throughout its stroke between an initial start position at one end of the bobbin and a full stroke position at the opposite end of the bobbin. The core has its length selected to be inductively coupled to the variable pitch winding of the coil. The coil is energized by a constant alternating current source so as to produce an alternating output voltage whose imaginary voltage component across the coil varies linearly and continuously in magnitude throughout the stroke of the core.

DETAILED DESCRIPTION OF THE PREFERRED EMBODIMENT

Figure 1:
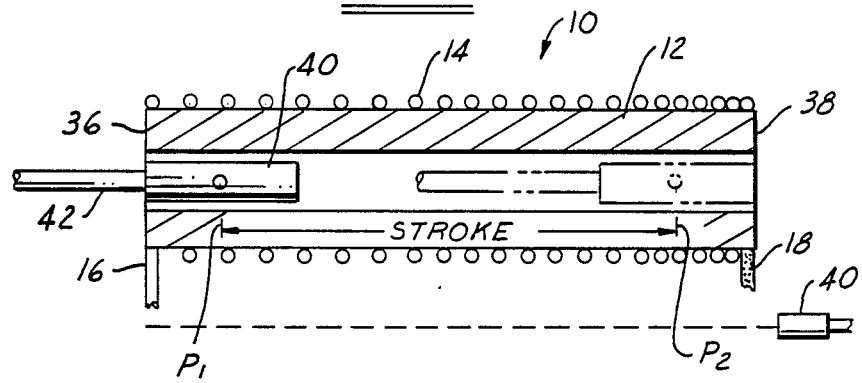
FIG. 1 is a diagrammatic representation of a two-wire construction including the present invention.
Figure 2:
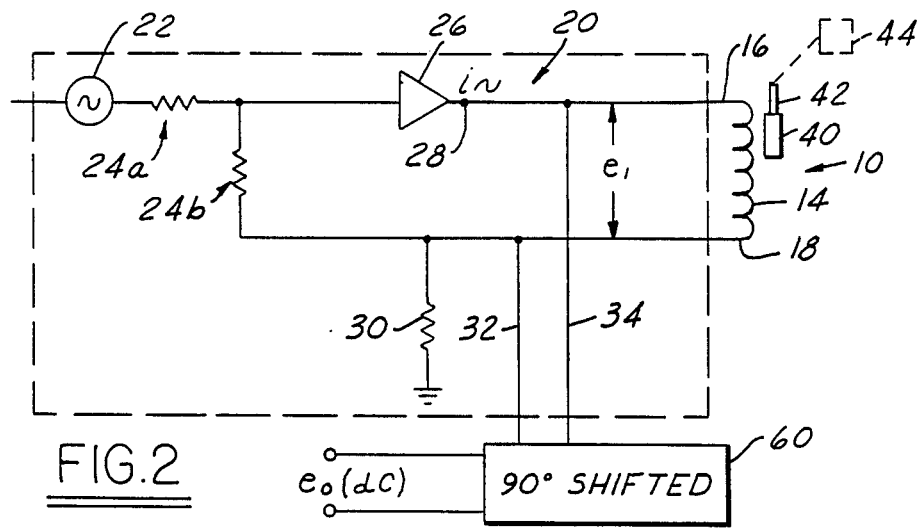
FIG. 2 is one example of a circuit used in association with the transducer construction of FIG. 1.

Referring now to FIG. 1, a position transducer 10 is illustrated that includes a bobbin 12 or equivalent coil former means to define a support for a coil 14 having a lead 16 at one end thereof and a lead 18 at the opposite end thereof for supplying power across the transducer 10. The leads are connected to a power supply 20 which includes a sinusoidal voltage source 22 connected through resistor 24 to an operational amplifier 26 that converts the voltage signal to a proportional current at the output 28 of the operational amplifier 26. The constant proportionality is determined by the resistors 24a, 24b and 30. If the voltage source 22 is constant, then the current will be constant and proportional to the output of voltage source 22. The constant current i from the output terminal 28 is connected to the lead 16 to an end of the coil 14. The lead 18 is connected to ground through a resistance 30. The circuit 20 includes an output across conductors 32, 24 that are connected respectively to the lead 16 and the lead 18 to define a point for detecting the output voltage from the transducer 10.

In accordance with certain principles of the present invention, the coil 14 is wound with a continuous variable pitch from an end point 36 to an end point 38 of the bobbin 12. The winding is selected so that it will be inductively coupled to a finite length core 40 of high permeability nickel alloy materials. The finite length core 40 with a drive rod 42, has an initial position P1 as shown in FIG. 1 and a final stroke position P2 shown in dotted lines in FIG. 1 so that the operating core will always remain within the envelope of the bobbin 12 thereby to reduce the over all length of the transducer 10 because none of the operative length of the high permeability core is ever located outside the ends of the bobbin 12. The high permeability core has low residual magnetism and low hysteresis in the device. The drive rod 42 is operatively connected with a device 44 which has a mechanical movement to be measured by the transducer 10. This core property and the selected finite length core is combined with the variable pitch winding configuration of the coil 14 such that the mechanical movement of the device 44 will result in a voltage $e_1$ across the conductors 32, 34 with an imaginary voltage component which is linear.

Figure 3:
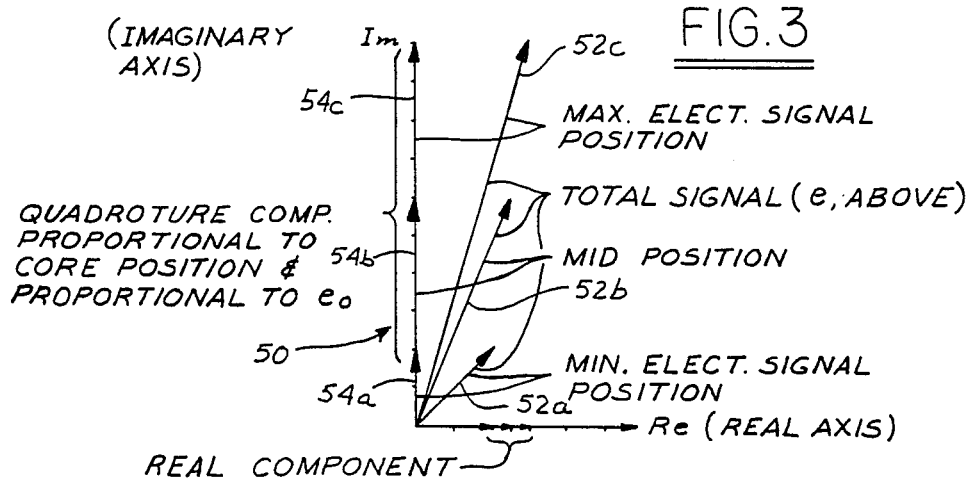
FIG. 3 is a diagram of the real and imaginary voltage components across the coil of the transducer in FIGS. 1 and 2.

Referring now to FIG. 3, a complex plane diagram 50 includes a real voltage component 52a–52c and imaginary voltage components 54a–54c at various positions of the transducer. At position P1 of the finite length core as shown in FIG. 1, the imaginary component 54a–54c is minimum. As the core is stroked into the bobbin between the initial position P1 to the final position P2, the imaginary voltage magnitude will progressively change as shown in the diagram 50 to have a voltage $e_1$ with a real component 52a–52c and an imaginary component 54a–54c. The change in the imaginary component is linear as the phase of the output shifts.

The total voltage signal $e_1$ formed across the conductors 32, 34 is directed to the input terminals of a 90 degree shifted synchronous demodulator circuit 60. The circuit 60 will process the $e_1$ voltage and will separate the linear imaginary component of the voltage $e_1$ and produce a linear d.c. signal $e_o$ across the output terminals of the circuit 60. The real component 52a–52c of the output voltage $e_1$ is temperature sensitive. Since the real component of the voltage signal is removed from the d.c. component which is proportional to the linear imaginary component of the output voltage $e_1$, the transducer 10 can be operated in a variable temperature environment without affecting the output characteristics of the transducer. Consequently, the device is suitable for a wide range of application and, furthermore, will produce an accurate linear signal representing the position of the mechanical device 44 as the high permeability core is moved from its initial position P1 to its final position P2.

I claim:

1. A position measuring system comprising:
   a mechanical device having a mechanical displacement;
   a drive rod operatively coupled to said mechanical device to be moved linearly in response to mechanical displacement of said mechanical device;
   a transducer for measuring the mechanical displacement of said mechanical device;
   a single coil wound on said coil former means having only two leads;
   a constant current source connected across said leads;
   means connected across said leads for suppressing the real component of the output voltage produced across said leads corresponding to the imaginary component of the output voltage produced across said leads by the constant current source;
   a finite length core of high permeability material located within said coil former means connected to said drive rod to be moved linearly within said coil former means;
   said core being positioned by said drive rod at an initial position wholly within said coil former means to be electromagnetically coupled with first segments of said single coil to produce an initial signal corresponding to an initial position of said mechanical device;
   said single coil having a non-linear winding pattern between said two leads, said core progressively electromagnetically coupling to said single coil as said core moves linearly within said coil former means so that movement of said core will produce a linear inductance variation across said leads which corresponds to the linear movement of said core within said coil former means.

2. In the measuring system of claim 1, said single coil having a continuously variable pitch selected to define a variable non-linear inductance in said single coil which is progressively electromagnetically coupled with said core to produce a measurement signal which is a linear function of the displacement of said mechanical device.

3. In the measuring system of claim 2, said core having a final position within said coil former means wholly within said coil former means and said single coil having a non-linear density which produces a signal point on a linear curve which represents the maximum displacement position of said mechanical device.

4. In the measuring system of claim 1, said core having a final position within said coil former means wholly within said coil former means and said single coil having a non-linear density which produces a signal point on a linear curve which represents the maximum displacement position of said mechanical device.

* * * * *